United States Patent
Zettl et al.

(10) Patent No.: US 8,433,536 B2
(45) Date of Patent: Apr. 30, 2013

(54) METHOD TO DETERMINE THERMAL PROFILES OF NANOSCALE CIRCUITRY

(75) Inventors: Alexander K. Zettl, Kensington, CA (US); Gavi E. Begtrup, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 598 days.

(21) Appl. No.: 12/526,714

(22) PCT Filed: Feb. 14, 2008

(86) PCT No.: PCT/US2008/053957
§ 371 (c)(1),
(2), (4) Date: Feb. 19, 2010

(87) PCT Pub. No.: WO2008/127776
PCT Pub. Date: Oct. 23, 2008

(65) Prior Publication Data
US 2010/0204951 A1    Aug. 12, 2010

Related U.S. Application Data

(60) Provisional application No. 60/889,906, filed on Feb. 14, 2007.

(51) Int. Cl.
*G01K 1/00* (2006.01)
(52) U.S. Cl.
USPC .......................................................... 702/130
(58) Field of Classification Search .................. 702/130
See application file for complete search history.

(56) References Cited

U.S. PATENT DOCUMENTS

| | | | |
|---|---|---|---|
| 5,384,716 A * | 1/1995 | Araki et al. | 702/134 |
| 6,710,366 B1 * | 3/2004 | Lee et al. | 257/14 |
| 6,905,736 B1 * | 6/2005 | Chow et al. | 427/564 |
| 7,109,581 B2 | 9/2006 | Dangelo et al. | |
| 7,291,299 B2 * | 11/2007 | Bando et al. | 264/81 |
| 7,863,798 B2 * | 1/2011 | Regan et al. | 310/300 |
| 2004/0001524 A1 * | 1/2004 | Jorimann et al. | 374/10 |
| 2004/0119064 A1 * | 6/2004 | Narayan et al. | 257/14 |
| 2005/0169348 A1 * | 8/2005 | Chen et al. | 374/161 |
| 2005/0249262 A1 * | 11/2005 | Bando et al. | 374/202 |
| 2006/0013280 A1 * | 1/2006 | Bando et al. | 374/100 |
| 2006/0173647 A1 * | 8/2006 | Nguyen | 702/136 |

(Continued)

OTHER PUBLICATIONS

Park et al., Selective Functionalization of Silicon Micro/Nanowire Sensors via Localized Joule Heating, Proceedings of the 2nd IEEE International Conference on Nano/Micro Engineered and Molecular Systems, Jan. 16-19, 2007, Bangkok, Thailand.*

(Continued)

*Primary Examiner* — Jonathan C. Teixeira Moffat
*Assistant Examiner* — Timothy H Hwang
(74) *Attorney, Agent, or Firm* — Technology Transfer and Intellectual Property Management Department, Lawrence Berkeley National Laboratory

(57) ABSTRACT

A platform that can measure the thermal profiles of devices with nanoscale resolution has been developed. The system measures the local temperature by using an array of nanoscale thermometers. This process can be observed in real time using a high resolution imagining technique such as electron microscopy. The platform can operate at extremely high temperatures.

19 Claims, 7 Drawing Sheets

U.S. PATENT DOCUMENTS

| | | | |
|---|---|---|---|
| 2006/0270116 A1 | 11/2006 | Dangelo | |
| 2007/0045756 A1* | 3/2007 | Chang et al. | 257/414 |
| 2007/0175296 A1* | 8/2007 | Subramanian et al. | 75/362 |
| 2007/0287271 A1* | 12/2007 | Panayil et al. | 438/482 |
| 2008/0087102 A1* | 4/2008 | Snell et al. | 73/861.85 |
| 2008/0159960 A1* | 7/2008 | Klingeler et al. | 424/9.32 |
| 2009/0190626 A1* | 7/2009 | Bradley et al. | 374/16 |

OTHER PUBLICATIONS

Begtrup et al., Probing Nanoscale Solids at Thermal Extremes, PhysRevLett. 00, 155901 (2007).*

Koga et al., "Size- and Temperature-Dependent Structural Transitions in Gold Nanoparticles," Physical Review Letters, vol. 92, No. 11, pp. 115507-1-115507-4, (Mar. 19, 2004).

Walker et al., "Quantum-dot optical temperature probes," Applied Physics Letters, vol. 83, No. 17, pp. 3555-3557, (Oct. 27, 2003).

Begtrup et al., "Probing Nanoscale Solids at Thermal Extremes," Physical Review Letters, vol. 99, No. 15, pp. 155901-1-155901-4, Oct. 11, 2007.

Aigouy et al., "A Scanning Fluorescent Probe for Local Temperature Imaging of Microelectronic Circuits," Tima Editions/Therminic 2005, pp. 220-223, Belgirate, Italy (Sep. 28-30, 2005).

* cited by examiner

METHOD TO DETERMINE THERMAL PROFILES OF NANOSCALE CIRCUITRY

CROSS-REFERENCE TO RELATED APPLICATIONS

This application claims priority to PCT Application PCT/US08/53957 filed Jan. 14, 2008, which in turn claims priority to U.S. Patent Provisional Application 60/889,906 filed Feb. 14, 2007, which applications are incorporated in their entirety by reference herein.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

BACKGROUND OF THE INVENTION

Field of the Invention

This invention relates generally to heat generation issues in small semiconductor devices, and, more specifically, to a method of measuring temperature and heat profiles in such devices during their use.

Thermal management of semiconducting devices is a pressing issue in the semiconducting industry. As transistors and related devices shrink and their density increases, local heat generation degrades speed, reliability, and lifetime of devices. As semiconducting devices generally operate above room temperature, high temperature thermal management is necessary for increasing the speed and power of modern electronics. Heat management has two components, heat removal and understanding heat generation and heat flow.

Currently the semiconducting industry relies heavily on finite element modeling and circuitry simulators in the design of new circuits. As active features become smaller and circuits become more densely packed, modeling becomes more complex and less reliable on the appropriate size scale. Currently, such modeling is not augmented by temperature measurements with high enough resolution. There is a need for thermal profiling of devices with nanoscale resolution in order to aid design, prototyping, and characterization of devices. In addition, such a method should be able to perform at elevated temperatures, where devices are prone to failure.

We have developed a method of applying single shot or reversible calibrated nanoparticle thermometers to thermally profile active devices with nanoscale resolution in real time. This approach does not interfere with device operation and could be used on either an individual device or batch scale. The method could be applied to any sort of thermal device, including electronics, nanofluidics, and photovoltaics. The thermometers can be tailored to the applicable temperature range and application, and the imaging of the thermal profiles could be performed in a variety of microscopes, for example scanning probe or electron microscopes.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The aforementioned needs are satisfied by the process of the present invention which comprises a calibrated nanoscale thermo-electronic platform on which nanostructures can be mounted and thermal investigations can be carried out.

In one embodiment of the invention a thermal test platform capable of operating at extreme temperatures (~4000K) has been developed, which can provide local temperature information with nanoscale resolution. An investigation of the high temperature properties of multiwalled carbon nanotubes (MWNTs) is described, as an exemplary thermal test platform application.

Figure 1:
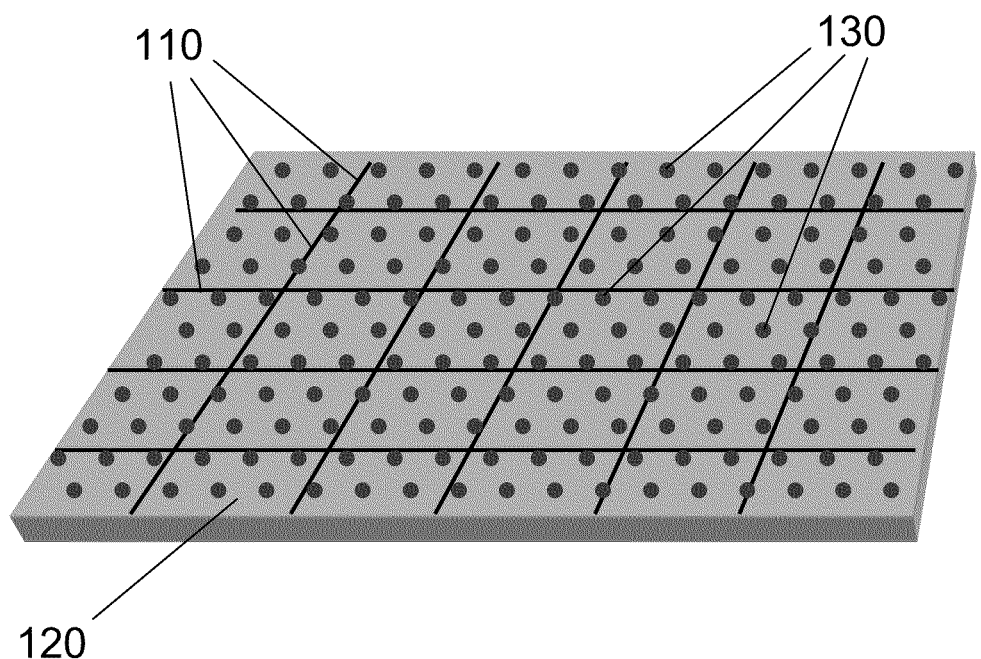
FIG. 1 is a schematic drawing that shows a thermal test platform as applied to a large scale integrated device, according to an embodiment of the invention.

A thermal test platform for a large scale integrated device is shown in FIG. 1. The crossing lines 110 are interconnects such as found in an integrated circuit 120. The dark circles are a deposited array of nanocrystal thermometers 130. The array of nanocrystal thermometers 130 can be used to create a two dimensional map of the thermal properties of the integrated circuit during operation.

Figure 2:
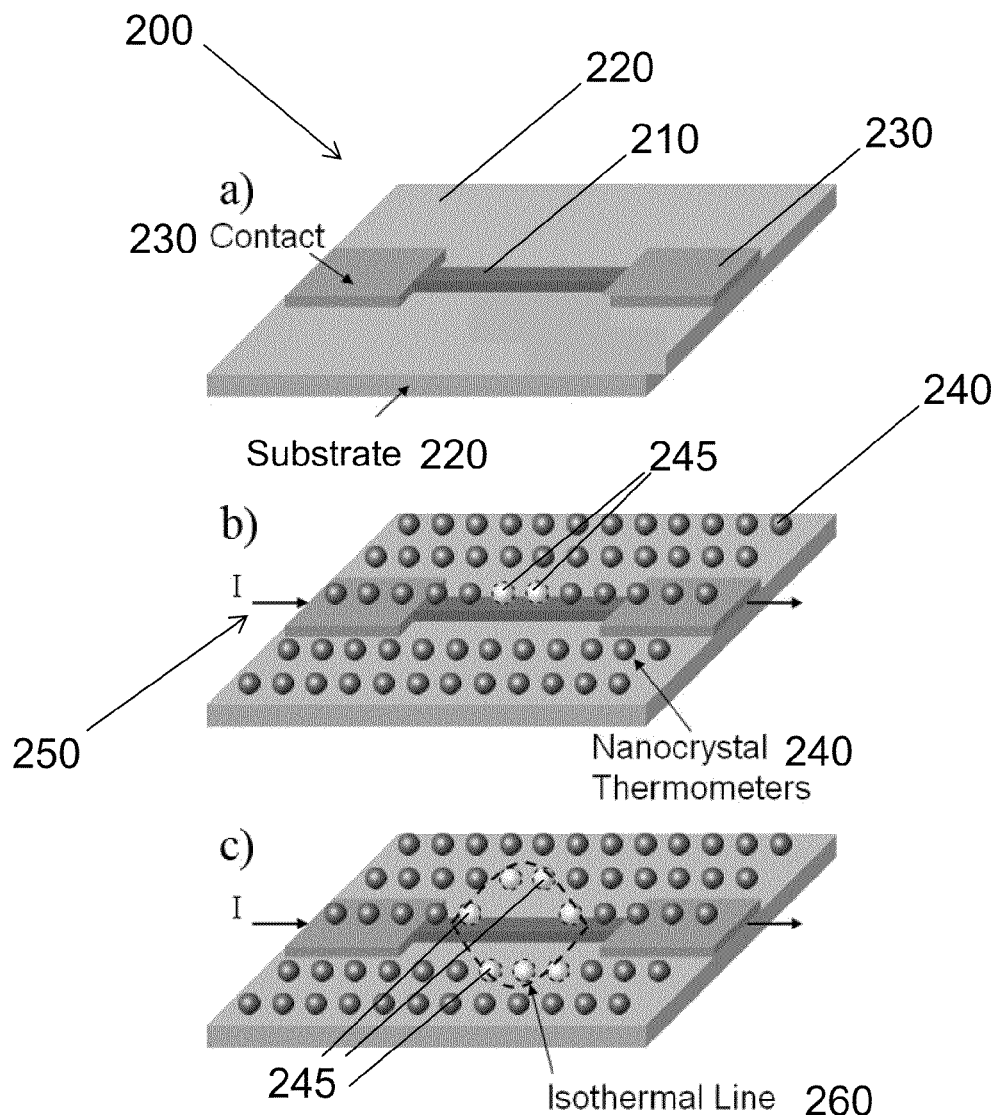
FIG. 2 is a series of schematic drawings that show how a thermal test platform can be used on a single device according to an embodiment of the invention.

FIG. 2 shows schematic diagrams of a nanoscale thermo-electronic platform in different stages of construction and operation, according to an embodiment of the invention.

In FIG. 2a, an assembly or platform 200 includes an electrically conducting nanostructure 210 mounted on an electrically insulating substrate 220 that has two electrical contacts 230. The substrate 220 is substantially insulating as compared with the nanostructure 210. The electrically conducting nanostructure 210 is in electrical communication with the two electrical contacts 230. In some arrangements, more than two electrical contacts 230 can be used. The electrical conducting nanostructure 210 is a nanostructure, such as a nanotube, nanowire, nanorod, or any other structure having unique properties arising from its nanoscale dimensions. In one embodiment, the electrical conducting nanostructure 110 is a carbon nanotube. In one embodiment, the substrate 120 is an electrically insulating electron-transparent membrane that is transparent to high energy electrons so that the platform can be observed in a transmission electron microscope (TEM) in real time. In one embodiment the electron-transparent membrane is a thin silicon nitride ($Si_3N_4$) membrane. In another arrangement (not shown), the assembly 200 as shown in FIG. 2a can also be any device with nanometer scale features that rise in temperature during operation. Examples of other imaging techniques that can be used to observe the platform include scanning tunneling microscopy (STM), atomic force microscopy (AFM), scanning near-field optical microscopy (SNOM), electrostatic microscopy, scanning electron microscopy, and fluorescence microscopy. The imaging technique can be chosen to be appropriate for the assembly 200.

As shown in FIG. 2b, a two-dimensional array of single-shot nanocrystal thermometers 240 has been added to the assembly 200 and a small amount of bias voltage has been applied to the nanostructure 210. The nanocrystal thermometers 240 can be formed by depositing metallic nanoparticles onto the substrate 220 and, optionally, the nanostructure 210. If the assembly 200 is a device with nanometer scale features (not shown) the metallic nanoparticles 240 can be deposited onto the device in any area of interest. For example, 6 nm gold nanoparticles can be used as nanocrystal thermometers 240. Such gold nanoparticles are reliable and easy-to-read local temperature probes as they evaporate immediately upon melting. Dotted circles 245 indicate nanocrystal thermometers 240 that have melted away. The melting temperature of 6 nm gold nanoparticles is well-known to be 1275K. Other nanoparticles with well-established melting temperatures can be used as well. Examples include indium, tin, platinum, and zinc sulfide. FIG. 2c shows the platform heated with a higher bias than was used in FIG. 2b. As the temperature continues to increase, the nanocrystal thermometers 240 on the nanostructure 210 melt away 245. An isothermal line 260 shows a "melting front" that marks the border between unmelted nanocrystal thermometers 240 and the former locations 245 of nanocrystal thermometers that have melted. As expected, the isothermal line 260 recedes from the nanostructure 210 as time or temperature increase, and a distinctive pattern is formed on the substrate 220. By employing finite element analysis to solve the heat distribution profile, the isothermal line 260 can be used to extract the position-dependent temperature along the platform 200 itself. As will be discussed below, nanoscale thermo-electric platform thermometry allows not only the local temperature of the nanostructure 210 to be determined (even when it greatly exceeds the melting point of the nanocrystal thermometers 240), but also the temperature-dependent thermal conductivity of the nanostructure 210.

In another embodiment of the invention, the nanocrystal thermometers 240 rely on phase transitions rather than melting to determine the temperature of the nanostructure 210 and substrate 220. Any nanocrystals made of materials whose phase transition temperatures are known can be used. Any imaging technique that can detect the phase transition in real time can be used with such nanocrystal thermometers. In one arrangement, magnetic nanocrystals that undergo a magnetic phase transition are used for the thermometry. The platform is used together with a magnetic force microscope or with a transmission electron microscope. The magnetic nanocrystal local temperature probes undergo magnetic phase transitions when they reach the transition temperature, which is well-known. As the temperature continues to increase, the magnetic nanocrystal thermometers 240 on the nanostructure 210 undergo phase transitions. An isothermal line 260 shows a "phase transition front" receding from the nanostructure 210 and forming a distinctive pattern on the substrate 220. Further analysis can be done as describe above for melting nanocrystal thermometers.

In another embodiment of the invention, a thermoelectric platform contains no substrate. A nanostructure is hung between two contacts and suspended in space. Nanocrystal thermometers rest on the nanostructure itself and the temperature of the nanostructure is determined by changes in the nanocrystal thermometers as described above. The analysis to determine a heat distribution profile is carried out as describe above.

Thus, in one embodiment of the invention, a nanoscale thermo-electronic platform can be described as having a substrate with at least two electrical contacts, a nanostructure electrically contacted to the contacts, and a plurality of nanocrystal thermometers on the substrate and the nanostructure. A system for investigating thermal properties on a nanoscale can be described as having a nanoscale thermo-electronic platform, such as a semiconductor device with nanoscale features, and an imaging device that can image the platform with nanoscale resolution.

As an example, the nanoscale thermo-electric platform, as described in FIG. 2, has been used to measure the temperature and thermal conductivity of MWNTs. Although theoretical studies suggest that nanotubes are surprisingly stable at thermal extremes, the breakdown temperature of MWNTs in vacuum has not been determined directly. In addition, nanotubes have unusual transport properties, including exceptionally high thermal and electrical conductivities. Although the temperature-dependent thermal conductivity ($\kappa$) of MWNTs is well established below room temperature, $\kappa$ in the extreme high-temperature limit has remained largely unexplored.

FIG. 3 shows a schematic drawing (3e) and a series of TEM images (3a-3d) of a nanoscale thermo-electric platform. High quality arc discharge MWNTs are ultrasonically dispersed in isopropanol and spin cast onto a substrate membrane suitable for imaging in a transmission electron microscope. Gold nanoparticle thermometers decorate the nanotube and the surrounding membrane. There is an electron-transparent $Si_3N_4$ membrane 320 on which a MWNT 310 has been mounted and onto which an array of gold nanocrystal thermometers 340 (indicated by the stippling in the figure) has been deposited. The discontinuous nanoparticle 340 array is non-conductive and does not disrupt the transport properties of the nanotube. The small gold nanoparticles 340 (typically <10 nm diameter) are reliable and easy-to-read local temperature probes as they evaporate immediately upon melting (unlike indium, for example, which has a much lower vapor pressure at melting and electromigrates along nanotubes under similar conditions). The melting temperature of gold nanoparticles is diameter dependent, so in this example, only particles with diameters of approximately 6 nm are observed closely, as they have a well-established melting temperature of 1275K. The MWNT is electrically contacted using palladium contacts 330, which make reliable low resistance electrical contacts to MWNTs. The palladium electrical contacts 330 are approximately 100 nm thick and are spaced approximately 500 nm apart. The contacts 330 are deposited onto the MWNTs using standard electron beam lithography and electron beam evaporation. Total sample resistances are typically ~10 k$\Omega$ in the low bias regime used herein. The assembly is imaged with a JEOL-2010 TEM operating at 100 keV and equipped with a custom designed in situ biasing stage.

Figures 3A, 3B, 3C, 3D, 3E:
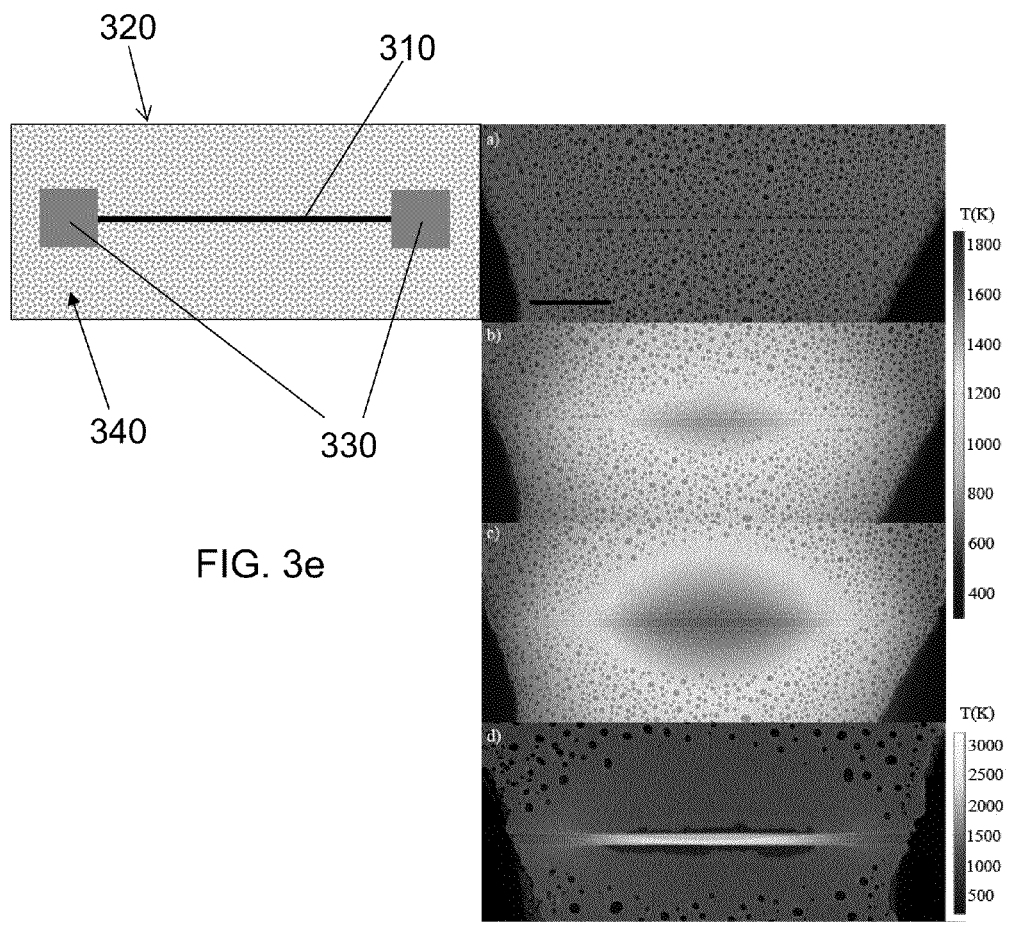
FIGS. 3a-d show TEM images of MWNT devices (a schematic of which is shown in FIG. 3e), with false color overlays to indicate local temperature under various conditions (note that FIG. 3d uses a different color scale). The scale bar in FIG. 3a is 100 nm; all images are at the same scale.

FIG. 3a shows the MWNT device under zero electrical bias conditions. The false color map indicates fully isothermal conditions with T=300K (blue). As the bias is increased, the temperature of the MWNT and membrane increases. FIG. 3b shows that the MWNT becomes hottest in the center due to the diffusive nature of the electrical conductance in the high bias regime, and the nanoparticle thermometers near the center of the tube are the first to melt and evaporate. The light-colored spots on the central part of the membrane are signatures of the evaporated thermometers, not holes in the membrane. As the bias is increased further, the thermometer melting/evaporation front continues to fan out from the center of the nanotube, both along the axis of the nanotube and on the surrounding membrane (FIG. 3c). Eventually, at sufficiently high bias, the $Si_3N_4$ membrane most closely adjacent the MWNT becomes so hot that it begins to disintegrate. The disintegration provides a second independent calibration point, at 2173K, the breakdown temperature of $Si_3N_4$. As the bias is still further increased, continued disintegration causes the membrane to peel back from the MWNT, decreasing the heat loss to the membrane and allowing the MWNT to heat even more effectively for a given electrical power input. At extreme temperatures, the MWNT eventually becomes fully suspended, and ultimately it fails catastrophically. FIG. 3d shows (for a different MWNT) the thermal profile just prior to failure; the center portion of the nanotube is at T=3200K. Note different temperature color scale for this image. Other MWNTs (including that of FIGS. 3a-c) typically survive to similar maximum temperatures. The electrical current density prior to failure for the MWNT of FIG. 3d (with inner diameter 4.8 nm and outer diameter 14.7 nm) is $1.7 \times 10^8$ $A/cm^2$; other MWNTs show comparable current-carrying capability at the stability threshold.

The measured onset temperature for MWNT sublimation, 3200K, approaches theoretical predictions for nanotube stability and is 800 K higher than the onset temperature of sublimation of graphite. Nanotubes are thus the most robust form of carbon. The exceptional mechanical stability is attributed to the strength of the $sp^2$ bond and the relatively defect-free structure of MWNTs.

The thermal conductivity of MWNTs ($\kappa$) below room temperature has been studied extensively, with measurements and simulations showing that in $\kappa$ increases with increasing temperature. At high temperatures, increased phonon scattering should cause a decrease in the thermal conductivity with a peak expected near room temperature. Despite great scientific and practical interest in the high temperature thermal conductivity of nanotubes, no reliable experiments have been performed in the extreme high temperature limit.

The nanoscale thermo-electric platform has been used to determine $\kappa$ of MWNTs at high temperature. Finite element analysis has been employed to solve the heat equation at a given applied bias to determine the temperature distribution of the nanoscale thermo-electric platform system. As a diffusive conductor in this regime, the MWNT obeys the classical heat equation with Joule heating. Treating the nanotube as a one-dimensional system with cross-sectional area A yields the heat equation:

$$A\nabla(\kappa \nabla T) + IV/L = 0 \quad (1)$$

where $\kappa$ is the temperature dependent thermal conductivity, I the temperature, I the electrical bias current, V the voltage across the tube, and L the length of the tube. In the high temperature limit $\kappa$ incorporates both Umklapp and second-order 3-phonon processes and may be expressed as $$\kappa(T) = 1/(\alpha T + \beta T^2) \quad (2)$$

with the linear term representing Umklapp (two-phonon) scattering and the quadratic term representing 3-phonon processes.

Using Equation (2) for $\kappa$ of the MWNT, dne can solve self-consistently for the thermal distribution of the nanoscale thermo-electric platform system. The model has been calibrated using the dissipated powers and resulting temperature profiles determined from the nanoparticle thermometers and the breakdown of $Si_3N_4$. Appropriate boundary conditions account for heat loss to the contacts and membrane. The thermal conductivity $\kappa$ was found to be 150 W/m K (watts per meter Kelvin) for MWNTs at 1275K, with $\alpha = 4.8 \times 10^{-6}$ m/W and $\beta = 4.3 \times 10^{-10}$ m/W K. Hence, the contribution of 3-phonon scattering modes becomes non-negligible at temperatures exceeding 1100K.

Figure 4:
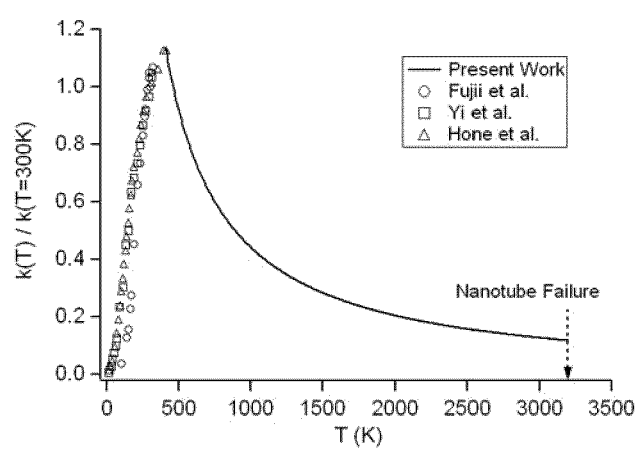
FIG. 4 is a plot of high temperature thermal conductivity κ of MWNTs as a function of temperature.

FIG. 4 is a plot of thermal conductivity ($\kappa$) as a function of temperature for MWNTs. It shows the full temperature dependence of $\kappa$ from room temperature to nanotube failure at 3200K, along with previously determined low temperature $\kappa$ results for various carbon nanotubes, all normalized at 300K. (Experimentally determined high temperature $\kappa$ reflecting Umklapp and 3-phonon processes (Eq. (2)) is plotted as a solid line.) Also plotted are literature results for $\kappa$ of various carbon nanotubes at low temperatures 18-20. It was found that even at T~1000K the MWNT retains 50% of its peak thermal conductance, and at T~3000K it still displays 10% retention. Even at temperature extremes, MWNTs are impressive thermal conductors.

In another exemplary embodiment, the melting point of gold nanoparticles down to 3 nm in diameter was investigated using the nanoscale thermo-electric platform as described herein. The melting point of gold nanoparticles is well-established at particle size d=6 nm, but the melting point is known to be highly diameter dependent. To date, the melting point of gold nanoparticles has not been experimentally mapped out in the ultra-small particle regime.

FIGS. 5a-5e show TEM observations of the melting point of gold nanoparticles, employing the calibrated nanoscale thermo-electronic platform as discussed above. Gold nanoparticles of various sizes reside directly atop a MWNT. An electric bias is applied to the MWNT, and the temperature is determined at each steady state plateau (shown in FIGS. 5b-5e). As anticipated, smaller gold nanoparticles melt at lower temperatures.

Figure 5A:
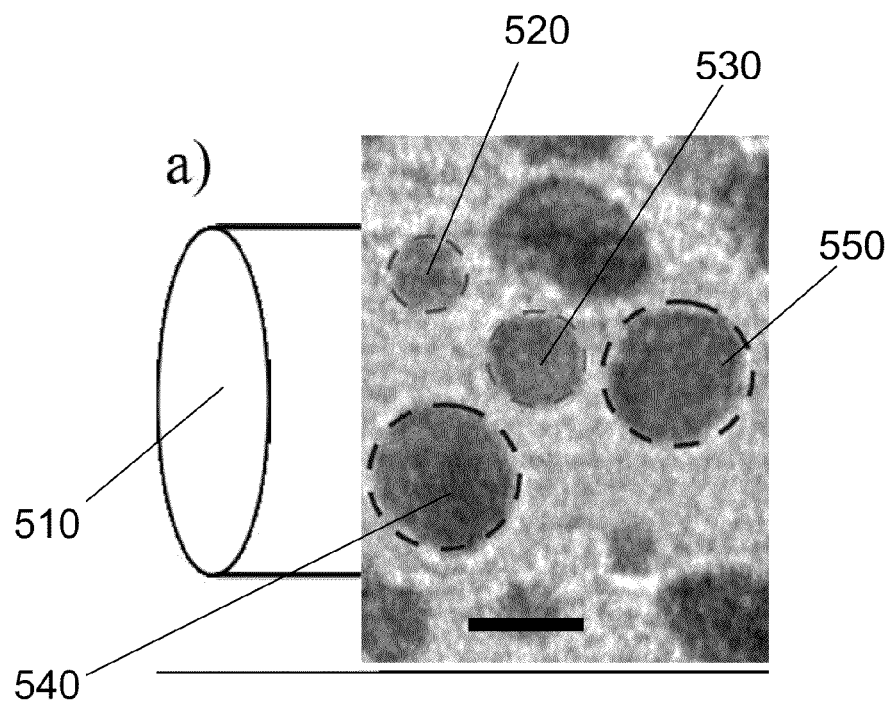
FIG. 5 includes a series of schematic drawings and images that illustrate a thermal test platform during various stages as used to determine the diameter dependence of the melting point ($T_m$) of gold nanoparticles.

FIG. 5a is a schematic drawing coupled with a TEM image showing a thermo-electronic platform before applying heater bias voltage. The drawing at left indicates the location of a MWNT heater 510. Nanoparticles reside directly atop the MWNT heater 510 as indicated in the TEM image of the device. The scale bar is 5 nm. Selected gold nanoparticles on the heater surface are outlined by dotted lines for clarity. Nanoparticle 520 has a diameter of approximately 3 nm. Nanoparticle 530 has a diameter of approximately 4 nm. Nanoparticle 540 has a diameter of approximately 6 nm. Nanoparticle 550 has a diameter of approximately 6.5 nm.

Figures 5B, 5C, 5D, 5E:
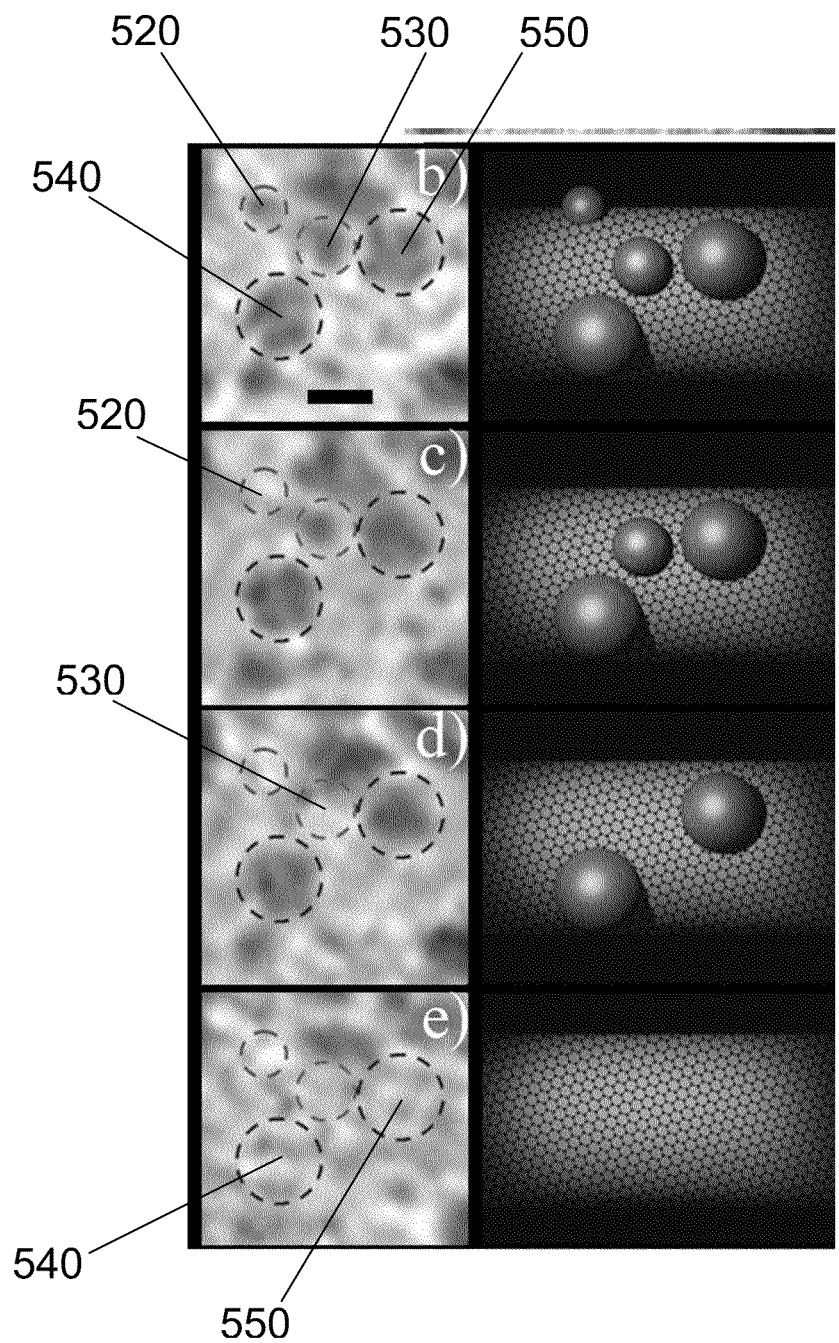

FIGS. 5b-5e are frames from TEM video recordings that were made as the bias on the MWNT 510 was increased. At successively higher temperatures, larger diameter nanoparticles melt and evaporate. At the right of each image is shown a rendered model of the system. In FIG. 5b, the heater temperature is 1165K, and no nanoparticles melt yet. In FIG. 5c, the heater temperature is 1130K, and the smallest nanoparticle 520 melts and evaporates. In FIG. 5d, the heater temperature is 1200K, the medium nanoparticle 530 melts and evaporates. In FIG. 5e, the heater temperature is 1275K, and the large nanoparticles 540, 550 melt and evaporate.

Figure 5F:
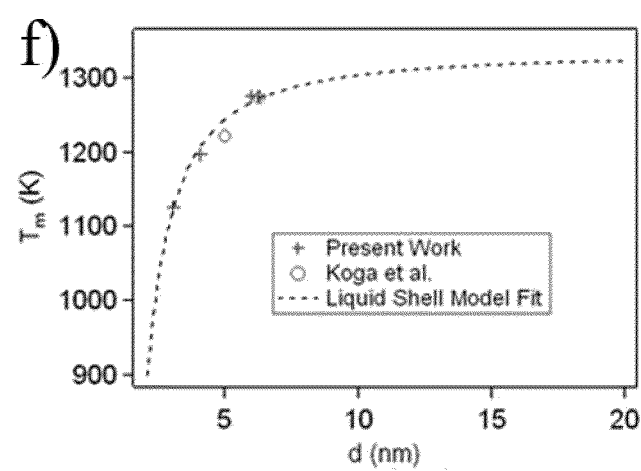

FIG. 5f is a plot of the melting temperature for gold nanoparticles as a function of nanoparticle diameter. Data from this experiment shown in FIGS. 5a-5e (crosses) show a strong diameter dependence. Also plotted are experimental results of Koga et al. (Koga, K., Ikeshoji, T. & Sugawara, K.-i. Size- and Temperature-Dependent Structural Transitions in Gold Nanoparticles. *Physical Review Letters* 92, 115507 (2004)) (open circles). The liquid shell model with shell thickness 0.5 nm (dashed line) provides an excellent fit to the data. The melting temperature of gold nanoparticles and the applicability of the liquid shell model, are thus established experimentally to a gold nanoparticle diameter of 3 nm.

In one embodiment of the invention, a method of nanostructure thermometry involves the steps of a) providing a thermally active device, b) depositing a plurality of nanocrystal thermometers onto the device, c) using a nanoscale imaging system to observe the device as current is flowing through the device, d) observing transformations in the nanocrystal thermometers, and e) determining an isothermal region at a border between nanoparticle nanocrystal thermometers that have undergone transformations and nanocrystal thermometers that have not undergone transformations. In some embodiments, the method can also involve using finite element analysis to determine a heat distribution profile of the device based on the isothermal region. In one embodiment, the position of the isothermal region can be used to extract a position-dependent temperature distribution for the device.

The thermally active device can be any of a variety of nanoscale devices. Examples include, but are not limited to, a transistor, a nanoelectronic device, a biological device, a nanofluidic device, and a photovoltaic device.

The nanocrystal thermometers can be any of a variety of nanocrystals. Examples include, but are not limited to, nanoparticle metals, semiconductors, insulators, magnets, superconductors, charge density wave materials, and spin density wave materials.

In some arrangements, the transformation is reversible. In some arrangements, the transformation is irreversible. In one embodiment of the invention the transformation is a change of state. Examples include, but are not limited to, melting evaporation, and sublimation. In another embodiment, the transformation is an electronic, optical, magnetic, electronic, structural, or phase transition. In another embodiment, the transformation comprises a metal-insulator transition.

In one embodiment of the invention, the thermally active device comprises an electron-transparent membrane and the imaging device is a transmission electron microscope. In one arrangement, the electron-transparent membrane comprises silicon nitride.

In another embodiment of the invention the thermally active device comprises a metal, a dielectric, $SiO_2$ or $Si_3N_4$.

In one embodiment of the invention the nanocrystal thermometers have a known melting point or a know phase transition temperature. In one arrangement, the nanocrystal thermometers comprise gold nanocrystals In one embodiment, the nanoscale imaging device can be, but is not limited to, any of scanning tunneling microscopes, atomic force microscopes, scanning near-field optical microscopes, electrostatic microscopes, scanning electron microscopes, fluorescence microscopes, and magnetic force microscope. The thermally active device comprises a material appropriate for use with the nanoscale imaging device of choice.

In another embodiment of the invention method of nanostructure thermometry involves the steps of: providing a thermally active device, depositing a nanocrystal thermometer with a known transformation temperature onto the device, using a nanoscale imaging system to observe the device as current is flowing through the device, observing a transformation in the nanocrystal thermometer, and determining a temperature of the device based on the transformation of the nanocrystal thermometer. Examples of the transformation include, but are not limited to, one or more of change of state, electronic transition, optical transition, magnetic transition, electronic transition, structural transition, and phase transition.

The nanoscale thermo-electronic platform has obvious application for the investigation of high temperature properties of a broad range of other nanoscale particles and device structures. By using MWNTs as ultra-high temperature heating elements, the calibrated platform can investigate the high temperature properties of other nanoscale systems.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of nanostructure thermometry, comprising:
 a) providing a device comprising a substrate with at least two electrical contacts and a nanostructure electrically contacted to the contacts;
 b) depositing an array of nanocrystal thermometers onto the device, including onto the substrate and the nanostructure;
 c) using an imaging system to observe the device as current is flowing through the device;
 d) observing transformations in the nanocrystal thermometers; and
 e) determining an isothermal region at a border between the nanocrystal thermometers that have undergone transformations and the nanocrystal thermometers that have not undergone transformations.

2. The method of claim 1 further comprising using finite element analysis to determine a heat distribution profile of the device based on the isothermal region.

3. The method of claim 1 wherein operation e) is used to extract a position-dependent temperature distribution for the device.

4. The method of claim 1 wherein the device is selected from the group consisting of a transistor, a nanoelectronic device, a biological device, a nanofluidic device, and a photovoltaic device.

5. The method of claim 1 wherein the nanocrystal thermometers are selected from the group consisting of metals, semiconductors, insulators, magnets, superconductors, charge density wave materials, and spin density wave materials.

6. The method of claim 1 wherein the transformations are reversible.

7. The method of claim 1 wherein the transformations are irreversible.

8. The method of claim 1 wherein the transformations comprise a change of state.

9. The method of claim 1 wherein the transformations comprise melting.

10. The method of claim 1 wherein the transformations comprise evaporation or sublimation.

11. The method of claim 1 wherein the transformations are selected from the group consisting of an electronic transition, an optical transition, a magnetic transition, an electronic transition, a structural transition, and a phase transition.

12. The method of claim 1 wherein the device comprises an electron-transparent material and wherein the imaging device is a transmission electron microscope.

13. The method of claim 12 wherein the electron-transparent material comprises silicon nitride.

14. The method of claim 1 wherein the device comprises $SiO_2$ or $Si_3N_4$.

15. The method of claim 1 wherein the nanocrystal thermometers have a known melting point.

16. The method of claim 1 wherein the nanocrystal thermometers comprise gold nanocrystals.

17. The method of claim 1 wherein the nanocrystal thermometers have a known phase transition temperature.

18. The method of claim 1 wherein the imaging device is selected from the group consisting of scanning tunneling microscopes, atomic force microscopes, scanning near-field optical microscopes, electrostatic microscopes, scanning electron microscopes, fluorescence microscopes, and magnetic force microscopes.

19. The method of claim 1 wherein the device comprises a material appropriate for use with the imaging device.

* * * * *